United States Patent
Cohn et al.

(10) Patent No.: US 6,248,487 B1
(45) Date of Patent: Jun. 19, 2001

(54) EXTENSIONS AND IMPROVEMENTS OF METHOD OF PRODUCING AN OPTICAL WAVE WITH A PREDETERMINED FUNCTION

(75) Inventors: Robert W. Cohn, Louisville; Shaad Bidiwala, Lexington, both of KY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/538,245

(22) Filed: Apr. 26, 1999

Related U.S. Application Data

(63) Continuation-in-part of application No. 08/756,967, filed on Oct. 31, 1996, now abandoned.

(51) Int. Cl.[7] .................................................. G03C 5/00
(52) U.S. Cl. ........................... 430/30; 430/321; 359/565; 359/569; 359/571; 359/575
(58) Field of Search ................................ 430/321, 323, 430/945, 30; 216/26, 66; 359/565, 569, 571, 575

(56) References Cited

U.S. PATENT DOCUMENTS

| | | | |
|---|---|---|---|
| 4,765,714 | * | 8/1988 | Horner et al. .................. 350/162.13 |
| 5,363,186 | * | 11/1994 | Cohn et al. ............................... 356/4 |

\* cited by examiner

*Primary Examiner*—Nam Nguyen
*Assistant Examiner*—Steven A. Ver Steeg
(74) *Attorney, Agent, or Firm*—William G. Auton

(57) ABSTRACT

Spatial light modulators (SLMs) can be amplitude-only modulated, phase-only modulated, or the pixel amplitudes can even be a function of phase. However, practical devices providing independently controllable values of phase and amplitude are not expected for some time. It has been possible to design modulation patterns for these limited range SLMs that do produce diffraction patterns similar to those possible from full complex SLMs, but hours of intensive iterative optimization usually have been required. Our approach instead develops and evaluates direct, pixel-by-pixel encoding algorithms that map the limited range modulation properties onto the entire complex plane. The advantage of these algorithms (generally recognized by the name pseudo random encoding) over iterative optimization is that designs can be performed in real-time making systems adaptable to rapidly changing situations. For laser scanning using SLMs, encoding enables multiple spots to be generated and their positions to be maintained on multiple moving targets. For correlators, a fast encoding method would provide a way to adaptively construct composite filters (capable of recognizing objects from many perspectives, or classes of objects) by linearly combining individual matched filters. For fixed pattern diffractive optical interconnects, the encoding method can lead to faster iterative optimization algorithms, as well and the devices that are suggested by the design can be affordably produced using existing microfabrication art.

1 Claim, 10 Drawing Sheets

PATTERNING BI-AMPLITUDE PHASE MODULATORS

Contact print through opaque layer then direct write in resist layer or use excimer laser to ablate opaque and direct write in resist in ine step.

A custom glass/chrome photomask is coated with a resist layer followed by direct write of resist The resist pattern is transferred to the glass photomask by reactive ion etching or similar methods.

Solid areas represent light blocking areas
No new processes required to make bi-amplitudes
Device can be transmissive or reflective (shown as transmissive)

The arcs represent the random phase spread (nu) for a desired amplitude. The actual phase is randomly selected over the limits set by the corresponding value of nu.

— ● Random bi-amplitude
--- ◆ MEDOF - only
✕ Random phase-only

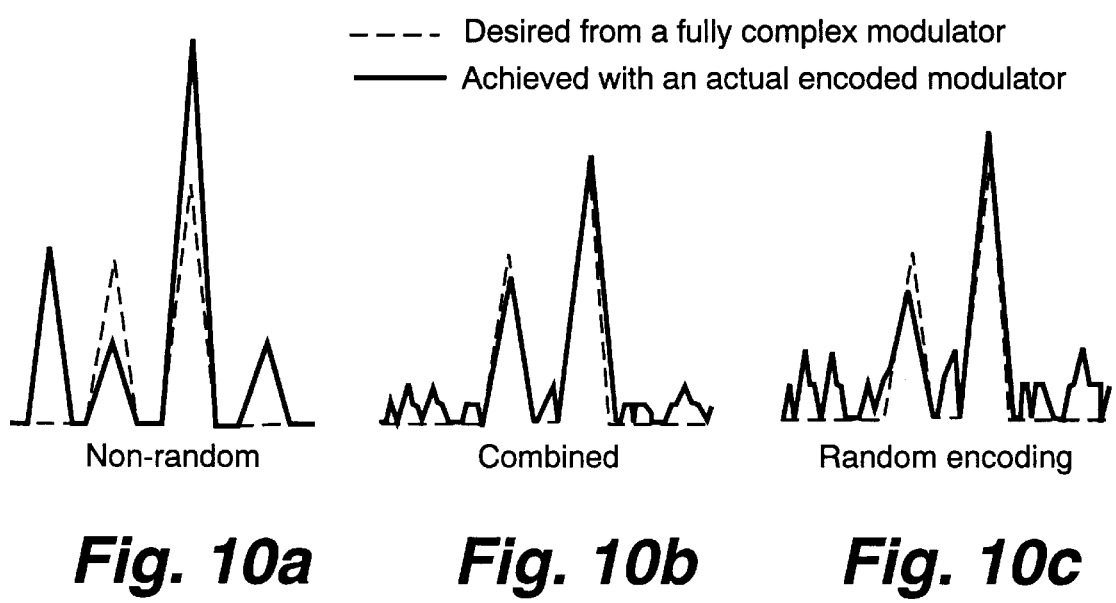
*Fig. 10a*     *Fig. 10b*     *Fig. 10c*

PATTERNING BI-AMPLITUDE PHASE MODULATORS

Fig. 11a

Contact print through opaque layer then direct write in resist layer or use excimer laser to ablate opaque and direct write in resist in ine step.

Fig. 11b

A custom glass/chrome photomask is coated with a resist layer followed by direct write of resist

Fig. 11c

The resist pattern is transferred to the glass photomask by reactive ion etching or similar methods.

Solid areas represent light blocking areas
No new processes required to make bi-amplitudes
Device can be transmissive or reflective (shown as transmissive)

EXTENSIONS AND IMPROVEMENTS OF METHOD OF PRODUCING AN OPTICAL WAVE WITH A PREDETERMINED FUNCTION

This application is a continuation-in-part of U.S. Ser. No. 08/756,967 filed Oct. 31, 1996, now abandoned.

STATEMENT OF GOVERNMENT INTEREST

The invention described herein may be manufactured and used by or for the Government for governmental purposes without the payment of any royalty thereon.

BACKGROUND OF THE INVENTION

This invention relates to diffractive optical elements, and more particularly to a method to synthesize amplitude and phase weights for desired diffractive patterns for optical elements in applications using phase-only spatial light modulators (SLM) and diffractive optical elements, their mathematical design, physical realization and fabrication procedure.

Phase errors can profoundly distort the intended diffraction patterns of spatial light modulators (SLMs) thus impacting the performance of optical processing systems that use SLMs. Phase errors are introduced by a variety of mechanisms. Phase-modulating SLMs can have inherent phase errors, due to fabrication process variations from pixel to pixel. Noise (e.g. thermal, quantization, etc.) on the video signals modulating SLMs is also transformed into phase errors. Furthermore, many applications, including composite filters for pattern recognition, binary diffractive optics and optical neural networks, can often be better understood and analyzed by modeling the modulations/signals as random, rather than as deterministic. This viewpoint has led to the invention/development of statistically based methods of design and new devices that arise from these design methods. This is the subject of this invention.

Random phase modulations across the surface of the SLM diffract into broadly spread noise patterns. These noise patterns not only have the appearance of speckle patterns, but in fact, arise from the identical situation of scattering of light from a random surface. There is a wealth of information on laser speckle (J. C. Dainty, *Laser Speckle and Related Phenomena*, Springer, 1984) and statistical optics (J. W. Goodman, *Statistical Optics*, Wiley, 1985) that is applicable to SLM-based optical processors. This invention was motivated by the opinion that speckle theory could be applied to advance the performance of optical processors that use SLMs and to lead to new applications of SLMs. More specifically, the present invention is an improvement on the technology of the following U.S. patents, the disclosures of which are incorporated herein by reference: U.S. Pat. No. 4,588,260 issued to Horner;

U.S. Pat. No. 4,765,714 issued to Homer;

U.S. Pat. No. 5,363,186 issued to Cohn and Liang; and

U.S. Pat. No. 5,276,636 issued to Cohn.

Both of the Cohn and Homer patents deal with SLM technology, and Cohn uses pseudorandom encoding of SLM systems. Improvements in diffraction efficiency, uniformity and signal-to-noise ratios is possible with the improvements to pseudorandom encoding (including partial encoding) of spatial light modulators that are described in this invention.

Traditional theories of speckle generation by rough surface scattering are adapted to analyzing SLMs. SLMs are modeled as arrays of sub apertures/pixels that are perturbed by random phase components. While traditional speckle theory models random surfaces as stationary random processes, SLMs can be programmed to produce nonstationary optical surfaces. This generalization is used to devise a new class of computer generated holography algorithms, referred to as pseudorandom encoding. The method is notable in that it 1) uses all available space bandwidth of the SLM; 2) produces diffraction patterns having large signal to noise ratio; and, most notably, 3) can be calculated in real-time by serial processors.

SUMMARY OF THE INVENTION

The invention includes several improvements to the method described in U.S. Pat. No. 5,363,186. One improvement includes the use of phase-only pseudorandom encoding in which improvements in diffraction efficiency, uniformity and signal-to-noise ratios are possible with the partial encoding aspects of speckle generation by phase-only spatial light modulators.

One embodiment of the present invention is a process to synthesize the desired diffraction by selecting appropriate values of the phase of a far field pattern of a phase-only spatial light modulator and which follow from using the principles of speckle generation. Speckle patterns are produced by scattering plane waves off of rough surfaces and observing the resulting pattern of intensity at some distance from the surface. This process begins by selecting the desired far field pattern of the diffractive optical wave emitted by the spatial light modulator. The next step entails performing a fast Fourier transform on the desired far field pattern of the diffractive optical wave to get a desired source distribution description for the diffractive optical wave. Next, pixel amplitudes $a_i$ are set for each pixel i: and pixel phases are set by a combination of random phase selection for specified portions of the diffraction pattern, and conventional pixel phase selection methods, such as the MEDOF method discussed below.

Other embodiments of the invention entail a variation on this process that uses partial pseudorandom encoding with coupled amplitude phase spatial light modulators, in which the pixel amplitude is expressed as a function of phase; or modulators that can produce any value of phase and binary values of amplitude, where the pixel amplitude has a value of 1 or 0, and is chosen pseudorandomly using binary statistics.

The individual improvements include the use of a search for fully complex functions that when pseudorandom encoded produce improved diffraction patterns having higher diffraction efficiency and lower noise. The search selects random phases for specified positions across the diffraction pattern. The search can be done without using fast Fourier transforms and thus it has a low numerical overhead. The method is especially useful for spot array generators and composite filters for pattern recognition. For spatially continuous diffraction patterns the arbitrarily random phases are known to produce nonuniformities across the diffraction pattern referred to as speckle. Specific diffusers have been developed in the field of holography to minimize this speckle effect. The speckle in this invention differs from holography applications in that the speckle is designed to appear in regions of the diffraction pattern where no, or minimal optical energy is desired.

The present invention is also a method referred to as partial pseudorandom encoding. It enhances the diffraction efficiency and uniformity, and reduces the noise level of diffraction patterns by encoding some of the desired fully complex values by the pseudorandom encoding method and encoding the remainder by using a method referred to as MEDOF. (MEDOF is described in R. D. Juday, Optimal realizable filters and the minimum Euclidean distance principle, Applied Optics, 32(26),5100–5111. (1993), the disclosure of which is incorporated herein by reference.) In MEDOF the points on the operating curve of the SLM that are closest to the desired (but unimplementable) complex values are used in place of the desired complex values. In MEDOF, there is also a search based on varying a threshold radius and (for non-circular SLM operating curves) angle that leads to the best performance. In partial pseudorandom encoding there is also a search over radius and angle that optimizes performance. There is a distinction between the MEDOF search and the partial. encoding search in that for some modulators (most notably the phase-only modulator) there is no improvement possible by using MEDOF, but there is improvement by using partial encoding.

The present invention is also a method for performing pseudorandom encoding of coupled amplitude-phase SLMs. This is to say the amplitude can be expressed as a function of phase. The method is a type of histogram equalization that makes the coupled amplitude-phase encoding process look like phase-only pseudorandom encoding. Two specific embodiments of the design method, one for a linear coupling of amplitude to phase and another for arbitrary coupling but using binary phase statistics are presented.

The present invention is also a method of performing pseudorandom encoding on modulators that can produce any value of phase and binary values of amplitude (we will refer to such modulators having this property as bi-amplitude modulators). In this case the amplitudes, rather than the phases are chosen pseudorandomly using binary statistics. The amplitude can either be one or zero. The performance in terms of signal to clutter ratio and uniformity is markedly better than for pseudorandom phase-only encoding of the same desired complex values.

The present invention is also an apparatus for implementing the modulation patterns as fixed pattern diffractive optics having low fabrication costs. The device is a relief pattern capable of producing analog phase levels (or several discrete phase steps) cascaded with a binary amplitude mask. Many methods already exist and are commonly used to produce analog phase relief patterns. The addition of a binary amplitude mask should be straightforward since the binary pattern can be exposed and developed on a chrome photomask. Then the phase levels can be etched through the openings in the chrome using one of several techniques (e.g. multi-level phase steps or direct write into resist.) The reason this apparatus (and method of fabrication) was not previously obvious is that no simple encoding algorithm was available. The preferred approach to solving this problem, up to the invention, would most likely have been to choose the amplitudes by simulated annealing or genetic algorithms. The addition of these variables would further increase the time required for a computer to find a good solution. This amount of time is already substantial.

One object of the invention is to compare the method with a recently-developed non-random, point-oriented encoding algorithm. This specific algorithm is referred to as MEDOF (for minimum Euclidean distance optimal filter). Design using MEDOF begins by first specifying an optimal complex valued filter. Each complex value is then mapped to the modulator value that is closest to the desired complex value.

This object together with other objects, features and advantages of the invention will become more readily apparent from the following detailed description when taken in conjunction with the accompanying drawings wherein like elements are given like reference numerals throughout.

DESCRIPTION OF THE DRAWINGS

Other aspects of the invention will become apparent after considering several illustrative embodiments, taken in conjunction with the drawings, in which:

FIGS. 10a–c illustrate how random coding improves performance quality of the diffraction pattern; and FIGS. 11a–c illustrate three implementations of bi-amplitude phase modulators that can be fabricated using standard microfabrication art.

DETAILED DESCRIPTION OF THE PREFERRED EMBODIMENTS

The invention includes several improvements to the method described in U.S. Pat. No. 5,363,186. One improvement includes the use of phase-only pseudorandom encoding in which improvements in diffraction efficiency, uniformity and signal-to-noise ratios is possible with the partial encoding aspects of speckle generation by spatial light modulators (including phase-only, coupled amplitude phase and bi-amplitude phase.)

Figure 1:
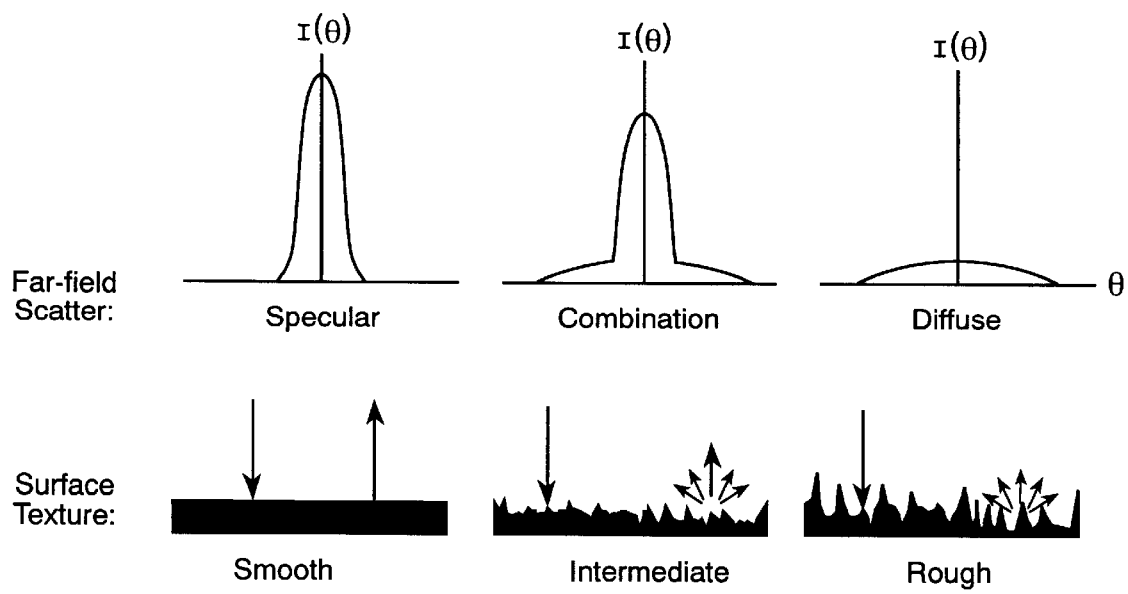
FIG. 1 is a diagram of speckle pattern generation in which phase adjustment is used to control specular intensity.

Speckle patterns are produced by scattering plane waves off of rough surfaces and observing the resulting pattern of intensity at some distance from the surface. This is illustrated in FIG. 1. Surfaces that are perfectly smooth produce mirror reflection. The resulting far field pattern is referred to as purely specular. The diffraction pattern from a very rough surface (for which the rms optical path differences are much greater than a wavelength) instead produces diffuse scatter which is observed as a speckle pattern. The high spatial frequency of the surface causes the light to diffract over a much greater angular range than the specular component, and the (typically) random texture of the roughness gives the speckle pattern its noise-like intensity pattern. FIG. 1 only illustrates the average intensity envelope of the speckle pattern. The shape and spread of the envelope is due mainly to the size of the individual rough grains. Surfaces that are less rough produce partially developed speckle patterns which are composed of the broadly diffused speckle pattern, plus a specular component of reflection. FIG. 1 illustrates that it is possible to vary the intensity of specular light by controlling roughness. This analysis would be identical for transmissive surfaces of spatially varying thickness or refractive index.

The formation of speckle can be viewed as the random phasing of plane wavefronts at a great distance from the surface. This is specifically illustrated in FIG. 2. The wavefronts arise from an array of N point sources (which might model a surface or a spatial light modulator). We will consider the effect of different types of source distributions on the far field pattern. If all the wavefronts are of the same phase then they will reinforce each other and produce an intense light distribution on the optical axis. This corresponds to the purely specular diffraction pattern in FIG. 1. If the phases of the point sources are randomly distributed between 0 and $2\pi$ radians then the wavefronts interfere with all different phases and the observed intensity is much weaker. This corresponds to the purely diffuse diffraction pattern in FIG. 1. The percentage of diffuse to total energy (specular+diffuse energy) can be varied from 0% to 100% by increasing the randomness of the phases from 0 to $2\pi$.

Figure 2:
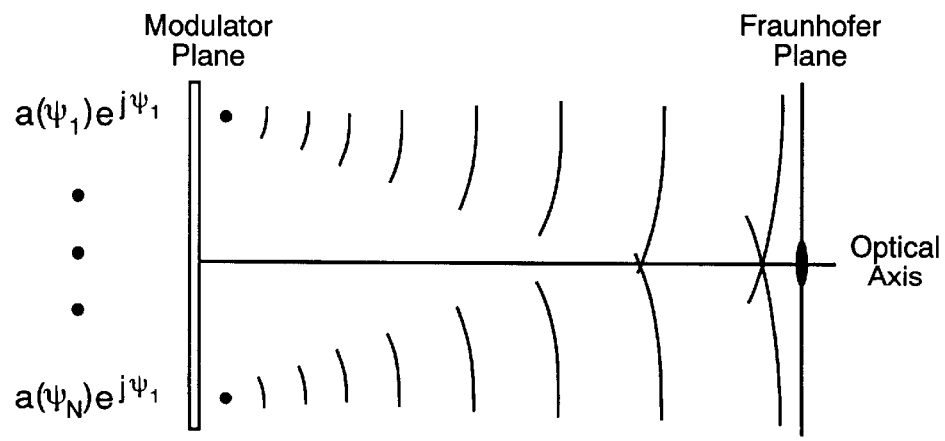
FIG. 2 is an illustration of a phased array geometry for which large numbers of wavefronts from an SLM are added together in the far field.

The superposition of randomly phased wavefronts (as illustrated in FIG. 2) can also be interpreted as performing statistical averaging. The concept is similar to Monte Carlo simulation methods. If a large number of repeated experiments or trials are performed and the results are averaged together then the average result is approached with increasing accuracy as the number of trials is increased. This is often referred to as the law of large numbers. For example, considering simply pouring a stream of salt onto the ground. After only a few grains are scattered, the distribution of grains appears random, but over a period of time a mound forms that becomes increasingly well defined, smooth and deterministic. From this statistical viewpoint, the superposition of wavefronts is identical in concept. Increasing the number of interfering wavefronts results in diffraction patterns that more accurately approach the average (i.e. the expected value) of the diffraction pattern. This invention is heavily based on this particular viewpoint.

Since SLMs have a moderately large number of pixels (10,000 to one million,) we have observed and report diffraction patterns that very closely approximate their true average (that would result for an infinite number of pixels.)

Extension of these basic concepts leads to (1) new methods of evaluating the performance of optical processors and (2) new and faster methods of programming fully complex-valued (i.e. arbitrary amplitude and phase) spatial modulation onto limited range (e.g. phase-only, coupled amplitude and bi-amplitude phase) SLMs. We refer to these new design algorithms as pseudorandom encoding. Mathematically, it can be viewed as design based on statistical averages. Physically, it can be interpreted as the result of light scattering from rough surfaces. These surfaces are more general than traditional speckle theories, especially in that the statistical properties of each SLM pixel can be selected to effectively (i.e. on average) produce a desired modulation.

A significant amount of research has been devoted to statistical modeling and experimental characterization of speckle properties. These models have focused on naturally rough types of surfaces such as machined surfaces, paper, and biological tissues. The surface is typically modeled as a plane perturbed by a roughness function that is a stationary random process (i.e. the statistics of roughness are unchanging with position across the surface.)

The most fundamental difference between the traditional surface models used in the theory of speckle and the models developed in this invention are that we generalize the surface so that it is modeled by a nonstationary process. This is to say that the statistics of the process (thus the texture of the roughness) varies with position. The nonstationary model is required to synthesize diffraction patterns by the pseudorandom encoding method in which the randomness (corresponding to roughness) in a particular position on the surface determines the amount of light specularly reflected from that position (see FIG. 1.)

A similarity between our models of the signal and traditional models of the roughness function is that each are usually assumed to be composed of statistically independent samples. This is equivalent to saying that the function is statistically uncorrelated with shifted versions of itself. However, once the signal is applied to program the SLM, some spatial correlation can be introduced. For instance, pixels that convert signal samples into a constant value over the pixel aperture cause the SLM surface to be correlated over the extent of the aperture. Limited spatial resolution of an SLM can also lead to correlated spatial modulation. For the experimental studies that we performed using liquid crystal televisions (LCTVs) we found that the electronic drive circuitry actually lowpass filtered the video signal causing the correlation distance to be greater than the pixel spacing. Thus the resolution of these devices is actually significantly lower than the spatial frequency of the pixels. In experimental comparisons with theories assuming uncorrelated samples, we can take steps to minimize the degree of correlation; most notably, by programming clusters of pixels identically as a superpixel.

In this invention we specifically modeled SLMs as arrays of pixels that are deterministic, but which can be perturbed by either the random parameters of random phase retardation or random amplitude modulation. In addition, the randomness from pixel to pixel is statistically independent and non-identically distributed (which is comparable to a white but non-stationary stochastic process.) The modeling as originally developed in the invention of U.S. Pat. No. 5,363,186 focused on SLMs with ideal phase-only (piston) modulating pixels such as the Flexure Beam DNDs (FBDMD), and birefringent liquid crystal SLMs. In this invention we recognize that the analyses developed can also be applied with some modification to modulators for which amplitude is a function of phase—the so called amplitude-phase coupled modulator. Example; of two coupled modulator characteristics (illustrated both in rectangular and polar) is given in FIG. 3. Most current SLMs have coupled amplitude phase modulation. Most notable are liquid crystal SLMs which can be varied from amplitude-mostly to phase-mostly modulation depending on the polarization of the illumination.

We can mathematically describe the two properties of scattering from randomly modulated SLMs that we used to develop pseudorandom encoding algorithms and to analyze their performance. The first property (referred to as the complex modulation property) is that an average, or effective, complex value of modulation can be ascribed to randomly modulated SLM pixels for purposes of modeling the far-field diffraction pattern. The second property (referred to as the noise or speckle background property) is that the far-field pattern will contain a noise/speckle background in proportion to the randomness of the SLM modulation pattern.

The properties are most easily shown for phase-only surfaces. A plane wave reflected from a phase-only surface can be represented by the complex-valued (indicated by bold) function a(x,y)=exp[jψ(x,y)]. The phase modulation ψ(x,y) is a random field consisting of independent non-identically distributed random variables with coordinates x and y. The statistics of the phase are then fully specified by the probability density function (pdf) of phase p[ψ(x,y)] which varies with position These assumptions about SLMs correspond to those given above. With these definitions we can directly calculate 1) the complex amplitude of the far-field diffraction pattern; 2) the expected complex amplitude of the far-field diffraction pattern; 3) the expected intensity of the far-field diffraction pattern; and 4) the standard deviation of the diffraction pattern intensity. The general method of calculation for any SLM is given in the article by Cohn and Liang in Jul. 10, 1994 Appl. Opt. and U.S. Pat. No. 5,363,186.)

The far-field diffraction pattern of any modulation pattern a is known to be $$A(f_x, f_y) = \mathcal{F}[a] = \int_{-\infty}^{\infty}\int_{-\infty}^{\infty} a(x, y)\exp[j2\pi(f_x x + f_y y)]dxdy \quad (1)$$

The expectation or ensemble average of any random variable is written $$\langle \psi \rangle = \int \psi p(\psi) d\psi$$

where < > denotes the expectation operator. The average complex-amplitude of the far-field pattern of the random complex modulation a can be written:

$$\langle A \rangle = \mathcal{F}[\langle a \rangle]$$

where the linearity of the Fourier transform and ensemble average operators has been used to interchange their order. Under the assumption that the random samples of a are statistically independent with position, the expectation of I the far-field intensity pattern is $$\langle I \rangle = \langle |A|^2 \rangle = |\langle A \rangle|^2 + \langle I_s \rangle \quad (4)$$

where $I_s(f_x, f_y)$ is a residual noise pattern due to the random phasings in the far-field. As long as the noise [represented by the second term of eq. (4) is adequately low, then eq. (4) is approximately the magnitude squared of eq. (3). In this average sense, any complex-valued modulation can be represented by the random phase-only modulation a(x,y) =exp [jψ(x,y)]. This is seen by explicitly taking the ensemble average of α which yields $$\langle a \rangle = \int p(\psi)\exp(j\psi)d\psi \equiv a_p \exp(j\phi_p) \quad (5)$$

where $a_p$ is the resulting expected amplitude modulation and $\phi_p$ is the expected phase modulation. We will often refer to $a_p$ as the effective amplitude, $\phi_p = \langle \psi \rangle$ as the effective phase, and $a_p = \langle a \rangle$ as the effective complex amplitude or modulation.

Eq. (5) demonstrates the first property: that randomness can be used to effectively produce filly complex modulation. Even though the actual (non-averaged) modulation is phase-only modulation, each pixel can represent, in an average sense, any desired amplitude $a_p(x,y)$ between 1 and 0. To show this amplitude control explicitly, consider the family of uniform density functions having random phase uniformly distributed over spreads v∈[0,2π]. Evaluating the uniform family in eq. (5) gives all values of amplitude between 0 and 1 according to $$a_p = \text{sinc}(v/2\pi). \quad (6)$$

Eq. (6) shows that it is possible to select a desired effective amplitude by choosing an appropriate value of v. The value of v can be different for each pixel (since the statistics are non-identical distributed or non-stationary) thus enabling near arbitrary diffraction patterns. This observation is the basis for the use of phase-only pseudorandom encoding. We will describe this and other encoding algorithms following a discussion of the second property of diffraction.

The term $\langle I_s \rangle$ in eq. (4) can be interpreted as the average noise or speckle background that is generated by randomness in the modulation. This noise envelope corresponds to the diffuse background in FIG. 1. The other term $|\langle A \rangle|^2$ in eq. (4) corresponds to the desired specular component in FIG. 1. The specular component can be much more complicated than the single diffraction peak drawn, since it results from the arbitrary phasing of a large number of SLM pixels (as illustrated in FIG. 2).

While eq. (4) does provide information on the expected specular diffraction pattern and the expected background noise, it does not (directly) provide information on the variance of a particular design. In concept, the variance can be directly calculated according to $$\sigma_I^2(f_x, f_y) = \langle I^2 \rangle - \langle I \rangle^2 \quad (7)$$

where $I \equiv |A|^2$. In practice, the mathematical manipulations can be quite involved. A very general derivation for an array of pixels is presented in the article by Cohn and Liang in the Jul. 10, 1994 copy of Appl. Opt. and U.S. Pat. No. 5,363, 186. We have found that the resulting expression can greatly simplify the effort of rederiving the variance over performing the operations using the fundamental operations described in eq. (7) for each new SLM characteristic. The results are general enough to apply to both phase-only and coupled amplitude phase SLMs and there is also no constraint on the spatial properties of the pixel. For example, we have used these general equations to evaluate the performance of SLMs using phase-only pixels having random tilts. Presentation of the specific equations in this summary would provide little additional insight.

Figure 4:
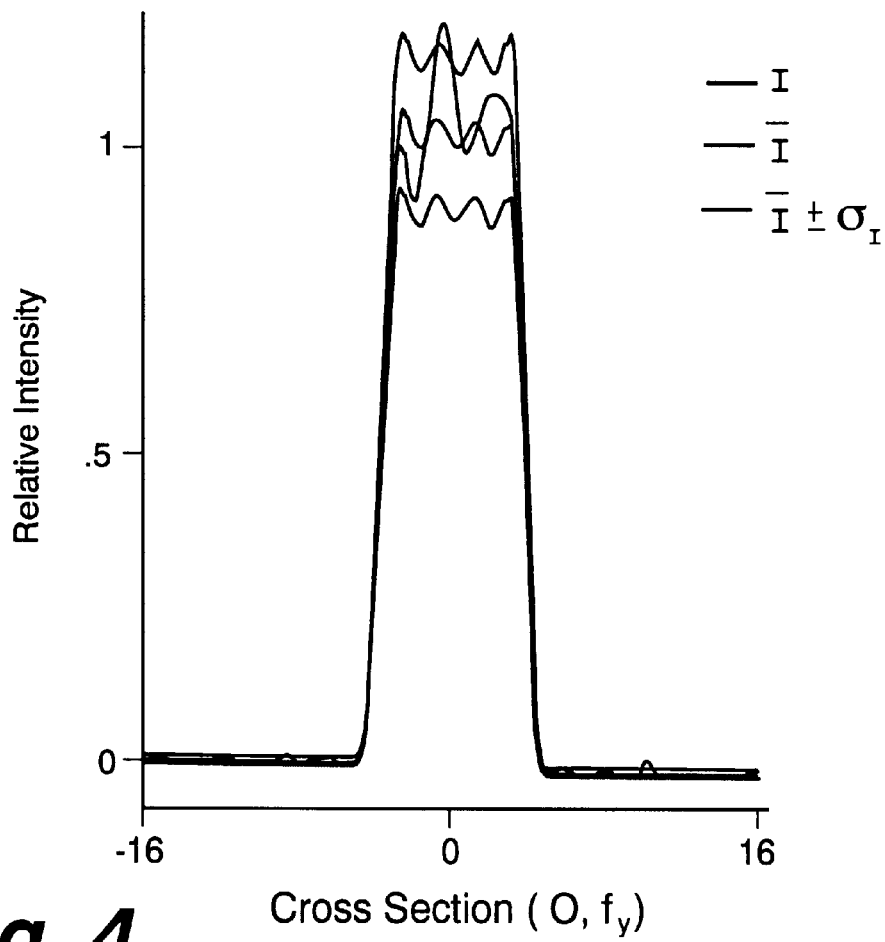
FIG. 4 is a diagram of a brick wall diffraction pattern achieved by pseudorandom encoding.

The most direct application of eq. (7) is in simply calculating the error bounds for the far-field diffraction pattern as produced by a randomly perturbed SLM. An example of this is illustrated in FIG. 4. The curves shown are one dimensional cross sections from a computer simulation of diffraction from a phase-only (piston-only) SLM. The specific pattern was designed (using phase-only pseudorandom encoding of U.S. Pat. No. 5,363,186) to give an equiripple (i.e. Chebychev) approximation to a brick wall response. The central curve of the three curves drawn with thin lines represents the expected intensity pattern calculated using eq. (3) and the outer curves are the one standard deviation error bars calculated using eq. (7). The error bounds give an idea about the quality of the design. The actual diffraction pattern (thick curve) compares closely with the average result (thin lines). That the fluctuations of the actual diffraction exceed the one standard deviation error bounds is not unexpected. If we had wanted to show a bound on almost all errors we would have instead plotted the 3σ error bounds.

The equations for expected complex amplitude, expected intensity and standard deviation of diffraction patterns [eqs. (3),(4) and (7)] have also led to the development of analytic expressions for important performance metrics, including signal-to-noise ratio (SNR), peak-to-noise ratio (PNR) and diffraction efficiency η. The exact meaning of these metrics can vary depending on the specific problem analyzed. Some specific results are presented to give more details on the properties of eqs. (3),(4) and (7) and how these are used to develop metrics. Diffraction efficiency is also an important measure of the performance of pseudorandom encoding; especially since it can be calculated without Fourier transforming the input modulation.

We will describe the diffraction efficiency for pseudorandom encoding of phase-only SLMs. Diffraction efficiency generally measures the ratio of energy that diffracts into the desired/design pattern compared to the total energy available. The definition can vary depending on whether the transmittance loss of the SLM is accounted for. Phase-only SLMs are sometimes stated as being 100% diffraction efficient because they introduce no transmission losses. However this often has little practical relevance because there will be implementation losses due to the limited (i.e. phase-only) modulation range of the SLM when designing an arbitrary diffraction pattern. For phase-only pseudorandom encoding we have chosen to define diffraction efficiency $\eta$ as the ratio of energy that goes into the desired diffraction pattern compared to the total energy (which is the sum of energies from both the desired and the speckle/noise diffraction patterns.) We found this expression for diffraction efficiency by summing up the energy in the corresponding desired and noise terms in eq. (4). The diffraction efficiency for a pseudorandom encoded phase-only (piston type pixels) SLM is then found to be $$\eta = \frac{1}{N} \sum_{i=1}^{N} a_{pi}^2 \tag{8}$$

where N is the number of pixels in the SLM and $a_{pi}=|<a_i>|$. The ratio of the energy that appears as speckle is then $1-\eta$. In the above-cited Cohn and Liang article, we originally interpreted the quantity $(1-\eta)N$ as an effective number of random pixels. Diffraction efficiency or effective number give a clear physical picture and a mathematical measure of the quality of any pseudorandom encoded design. Eq. (8) is especially important because it is expressed in terms of the desired complex modulation. Thus the quality of each pseudorandom design is known in advance of actually performing the encoding. We describe below how this metric has been used to rapidly search for the highest efficiency diffraction pattern by evaluating the efficiencies of the set of Fourier transform pairs that all produce the same intensity pattern (but which produce different phase patterns).

We can also show to what degree diffraction efficiency influences performance as measured by SNR and PNR metrics. A conventional definition of signal-to-noise ratio is $SNR=\langle I \rangle / \sigma_I$. We specifically considered single spot diffraction patterns (e.g. shown in FIG. 4) that were designed by phase-only pseudorandom encoding. The SNR metric developed specifically measures the ratio of diffraction peak intensity to its fluctuation at that same point. The reciprocal of SNR is the relative error of the peak intensity of the diffraction pattern. We found that the SNR can be approximated for this case as $$SNR \approx \sqrt{\frac{N}{2} \frac{\eta^2}{1-\eta}} \tag{9}$$

where we have expressed the result in terms of diffraction efficiency rather than effective number (as it was originally presented). The result clearly shows the influence of the number of SLM pixels and of the diffraction efficiency on the accuracy of the resulting diffraction pattern. To gain an appreciation of the relationships between SNR, $\eta$, N and the resulting diffraction patterns specifically consider the result illustrated by FIG. 4. For this case the 128×128 pixel SLM has N=16,384 pixels, an SNR of 8:1 and a diffraction efficiency of 8%.

A second measure describing the quality of single spot diffraction patterns is PNR. This can also be described a measure of peak intensity to standard deviation. The distinction with SNR is that for PNR the standard deviation is measured away from the spot in the noise background. This definition of PNR is often referred to as SNR in many publications (but we use the term PNR to distinguish from our first definition of SNR.) Further evaluation of eqs. (3), (4) and (10) showed that PNR is closely related to SNR and $\eta$ according to $$PNR \approx 2SNR^2 = \frac{N\eta^2}{1-\eta}. \tag{10}$$

Continuing with the numerical example from the previous paragraph we see that the PNR for the example in FIG. 4 is calculated to be 128:1. These correspond well with the resulting pattern (the thick curve in FIG. 4) in which the individual speckles are barely discernible on the plot.

Having completed discussion of the complex modulation property and the noise property of random modulations, we now describe various pseudorandom encoding methods that take advantage of the complex modulation property, and whose performance is evaluated using the noise property. We first describe pseudorandom encoding for phase-only modulation. This is presented for reference, since it was originally introduced in U.S. Pat. No. 5,363,186. However, it allows one to clearly see the extensions and improvements in the current invention. Several of the extensions are presented along with examples to improve clarity, and the concreteness of the invention.

Pseudorandom encoding for phase-only modulators was originally developed, as part of a contract on phase-only SLMs and the effect of random phase errors on optical processor performance. Phase-only encoding has since been demonstrated for applications of beam steering and beam shaping with simulations and experiments. It has also been applied to complex-valued pattern recognition filters and filter banks, and to designing spot array generators.

To review, pseudo-random phase-only encoding formulae follows from the complex modulation property. In terms of probability theory this property is mathematically equivalent to a property of characteristic functions, that the expected value of $a=\exp(j\psi)$ is $$\langle a \rangle = \int p(\psi) \exp(j\psi) d\psi = a_p \exp(j\langle\psi\rangle) \tag{5a}$$

where $p(\psi)$ is the probability density function (pdf) of the phase and $a_p$ is the resulting expected amplitude modulation. For pseudorandom phase-only encoding we select $\langle a \rangle = a_c$, i.e. $\langle\psi\rangle=\psi_c$ and $a_p=a_c$. These equivalences are obtained by selection of a specific pdf for any pair of amplitudes and phases desired. Since many SLMs, or at least the video driver circuits are arranged as arrays of individually addressable pixels, each pixel can be programmed independently of each other. The design equations as given here also assume statistical independence of the random variables associated with each pixel. In actual experiments with commercial grade SLMs used in video projectors, statistical correlations have been noted, and steps have been taken to minimize these effects.

EXAMPLE 1

The uniform family of density functions $$p(\psi; v) = \frac{1}{v} rect\left[\frac{v - \langle \psi \rangle}{2\pi}\right]; v \in [0, 2\pi]. \quad (11)$$

evaluated in eq. 5a gives all values of amplitude between 0 and 1 according to $$a_p = sinc(v/2\pi) \quad (6)$$

where $sinc(\alpha) \equiv sin(\alpha\pi)/\alpha\pi$. Therefore, amplitude $a_p = a_c$ can be encoded to a phase-only function by (a) inverting eq. 6 to find the spread $$v = 2\pi sinc^{-1}(a_c) \quad (12)$$

and then (b) using a uniform random number generator ran(iseed) of unity spread and zero mean, calculate the value of phase modulation $$\psi = \langle \psi \rangle + v ran(iseed) \quad (13)$$

that is designed to represent the mapping of $a_c$ to a. This formulation can be directly applied to each of the N pixels of the SLM in sequence. Note that the mathematical overhead is quite low and that even greater encoding speed is achieved by implementing the inversion of eq. 7 and the random number generator in eq. 8 by using lookup tables.

In our studies we have already demonstrated that for available phase-only SLMs having from N=16,000 to 250,000 pixels that quite accurate diffraction patterns and recognition filter representations are achievable. This is the first time that Monte Carlo methods, which are extensively used in many fields for modeling and tolerance analyses, have been employed to optical design. The advantage over other iterative approaches in terms of speed and simplicity is marked.

To summarize, this encoding algorithm for an array of N pixels having the desired complex amplitudes $a_{ci}$ is for $i=1$ to N the following three steps:

a) invert eq. (6) for $v_i$ given the value of $a_{pi} = |a_{ci}|$
b) select a number between $-\pi$ and $\pi$ using a uniform random number generator; and
c) scale this number by $v_i$ and offset by $\phi_{pi}$ to get the pseudorandom phase $\psi_{1i}$.

Encoding for other possible density functions would be obvious to persons skilled in the art.

Pseudorandom encoding for phase-only SLMs can be extended to coupled amplitude-phase SLMs. Most practical and currently available SLMs are actually coupled. (For example see FIG. 3). The current model can be extended so that rather than the amplitude a being unity, its value $a(\psi)$ is now a deterministic function of phase $\psi$. Under this assumption eq. (5) is generalized to $$\langle a(\psi) \exp(j\psi) \rangle \equiv \int_{-\infty}^{\infty} a(\psi) \exp(j\psi) p(\psi) d\psi. \quad (5b)$$

As with eq. 5a, the randomness permits us to realize arbitrary values of amplitude and phase. However, since this new average is amplitude weighted, $\psi_0$ is not equal to $\langle \psi \rangle$. For instance, if $p(\psi)$ is uniform (of the form of eq. 11) then there is no a priori knowledge of $\psi_0$, which suggests an encoding algorithm that performs a two dimensional search for $a_c = a_p$ and $\psi_c = \psi_0$. This problem of bias drift of $\psi_0$ can be eliminated by designing a class of pdf's $p(\psi)$ that compensate the amplitude coupling $a(\psi)$. This is to say that our approach to developing a pseudorandom encoding algorithm for coupled modulators is to make eq. (5b) look like the effective amplitude for phase-only pseudorandom encoding in eq. (5). This can be done by specifying an effective probability density function of the form $$p_{eff}(\psi) \equiv a(\psi) p(\psi) \quad (14)$$

so that the phase pdf $p(\psi)$ compensates for the amplitude weighting/coupling $a(\psi)$.

The effective pdf is of the form $p_{eff}(\psi) a(\psi) p(\psi)$. Only a proportionality can be specified for this equation at first. The correct scale factor is then found so that the cumulative distribution function $P(\psi)$ has total probability of 1 for $\psi = \infty$.

Note that individual non-uniform random number generators are needed depending on the particular coupling between amplitude and phase. One direct way to synthesize random numbers with the required pdf $p(\psi)$ is to transform a uniform distribution into the required pdf according to $$\psi = P^{-1}(s) \quad (15)$$

where s is a uniform random variable contained between 0 and 1, and $P(4)$ is the cumulative distribution function of $\psi$ [i.e. $p(\psi) = dP(\psi)/d\psi$]. In the field of image processing, this procedure for transforming statistics is referred to as histogram equalization. With these modifications it is possible to use randomness to overcome the limited modulation range of many types of SLMs in other than just phase-only SLMs.

The illustrative examples are presented of the derivation of the encoding algorithms, together with the derivations of the required random number generators.

EXAMPLE 2

An amplitude coupling function of a modulator (see FIG. 3, solid line) is linear with phase such that $$a(\psi) = m\psi + b; \psi \in [-2\pi 2\pi] \quad (16)$$

where m is the slope and $b = a(0)$. The effective density function desired is a rect function similar in form to eq. 11 having a spread $v$ and centered on the desired phase $\psi_c = \psi_0$ such that $$p_{eff}(\psi) \propto rect\left[\frac{v - \psi_0}{2\pi}\right]. \quad (17)$$

For this case the pdf is specifically $$p(\psi) = \frac{1}{\psi + b/m} rect\left[\frac{\psi - \psi_0}{v}\right] \ln^{-1}\left[\frac{\psi_0 + v/2 + b/m}{\psi_0 - v/2 + b/m}\right] \quad (18)$$

and the transformed random variable, eq. 18 is $$\psi = \frac{[\psi_0 + v/2 + b/m]^s}{[\psi_0 - v/2 + b/m]^{s-1}} - b/m. \quad (19)$$

Substituting eqs. 16 and 18 into eq. 14 gives a closed form expression for effective modulation for this encoding of $$a_c = \langle a \rangle = m\upsilon \, \text{sinc}\left[\frac{\upsilon}{2\pi}\right] \exp\left[\frac{\psi_0 + \upsilon/2 + b/m}{\psi_0 - \upsilon/2 + b/m}\right] \exp(j\psi_0). \quad (20)$$

Note that the magnitude of eq. 20 depends both on the spread $\upsilon$ and the phase offset $\psi_0$. Therefore a two parameter lookup table must be developed to encode all possible values of $a_c$. We have found that the lookup table is slowly varying and can be accurately interpolated with a small number of sample points. Also note that $\omega_0$ is between $-\pi$ and $\pi$ but that $\psi$ varies by twice this amount. This permits $\upsilon$ to extend up to $2\pi$ for any value of $\psi_0$.

Figure 3:
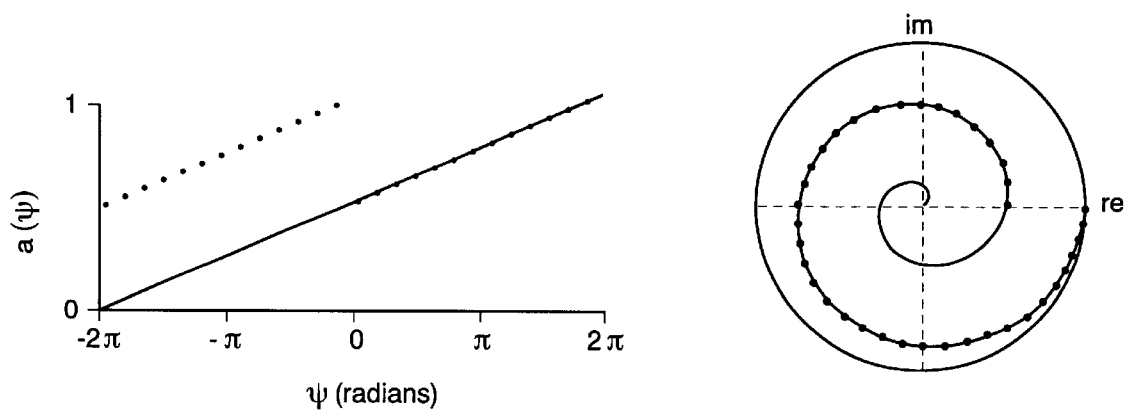
FIG. 3 is a diagram of amplitude-phase coupling for modulators having continuous and 360 degree modulo phase ranges.

Example 2 was presented for purposes of illustration. For actual SLMs the coupling can be quite different, and can in fact (for liquid crystal type SLMs in particular) be continuously varied from phase modulating to amplitude modulating as a function of the polarization of the illumination. One recognized limitation is that most SLMs available today can barely produce a $2\pi$ phase range. This does not constrain the encoding method if the amplitude coupling is viewed as a periodic function of phase. (As illustrated in FIG. 3 dotted line). Other pdf's can be used to advantage as shown in the following example.

EXAMPLE 3

The Identical Design Procedure as above is Followed for Discrete Binary Random Variables.

The effective density function $p_{eff}(\psi_0)$ has equal values at $\psi = \psi_0 \pm \upsilon/2$ and is zero otherwise. For these pdf's the effective complex amplitude is $$a_c = \langle a \rangle = \frac{2a(\psi_0 + \upsilon/2)a(\psi_0 - \upsilon/2)}{a(\psi_0 + \upsilon/2) + a(\psi_0 - \upsilon/2)} \cos(\upsilon/2)\exp(j\psi_0) \quad (21)$$

and the phase random variables are generated by a simple threshold test on the random number s. These results are especially useful in that this closed form result applies to any function $a(\psi)$ for which $\psi$ has a range of at least $2\psi$.

Pseudorandom encoding can be extended in other types of modulators. Consider a bi-amplitude phase modulator. It is a phase-only modulator plus it has one additional modulation state of zero transmittance (ss FIG. 6). The encoding algorithm is especially simple and easy to understand. Also the modulation characteristic is straightforward to fabricate as a fixed pattern diffractive optic.

EXAMPLE 4

For this example the modulator characteristic is bi-amplitude phase. Any desired phase $\psi_c$ can be directly produced by the modulator. We select the implemented phase $\psi$ to be equal to $\psi_c$ the desired phase. The amplitude of the modulator $a=|a|$ can be set to either 1 or 0. For the random variable a, there is a probability p that the random variable takes on a value of 1 and a probability $q=1-p$ that the random variable takes on the value of 0.(See FIG. 8). Thus, on average, the amplitude is the well known weighted average $$\langle a \rangle = 1 \cdot p + 0 \cdot q = p \quad (22)$$

which we use to represent any desired amplitude $a_c = \langle a \rangle = p$ between 1 and 0. The pseudorandom selection is directly performed using the standard uniform random number generator ran(iseed). If the value of ran is less than p then a is set to 1 and $\psi$ is set to $\psi_c$, otherwise, if ran is between p and 1 then a is set to zero. For this case the expected intensity of the diffraction pattern, eq. (4), reduces to $$\langle I(f_z) \rangle = \left| \sum_{i=1}^{N} A_{ci} \right|^2 + \sum_{i=1}^{N} p_i q_i \quad (23)$$

It is clear that the second term describing the noise or speckle background will be smaller if the desired amplitudes $a_{ci}$ are clustered near either 1 or 0, and this term will be larger if the amplitudes are clustered near 0.5. The level of the speckle indicates to what degree noise is affecting the accuracy of a design.

Figure 6:
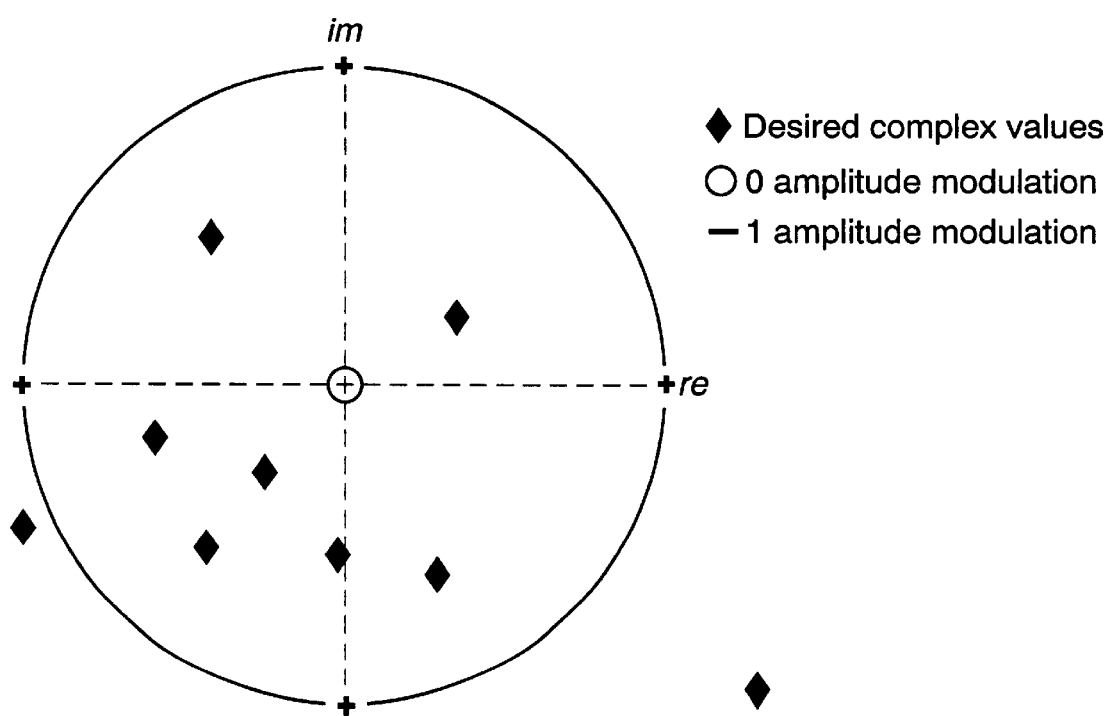
FIG. 6 is a chart of bi-amplitude phase modulation and the desired complex values illustrated on the complex plane.

To this point we have described multiple pseudorandom encoding algorithms that are variations or extensions of the phase-only pseudorandom encoding algorithm first presented in U.S. Pat. No. 5,363,186. Graphical illustrations of the encoding procedures are now presented and discussed in order to help visualize and to contrast the algorithms. FIG. 6 specifically shows the modulation characteristic on the complex plane. The diamond shaped markers indicate the desired complex values $a_c$ we wish to implement for a given design.

Figure 5A:
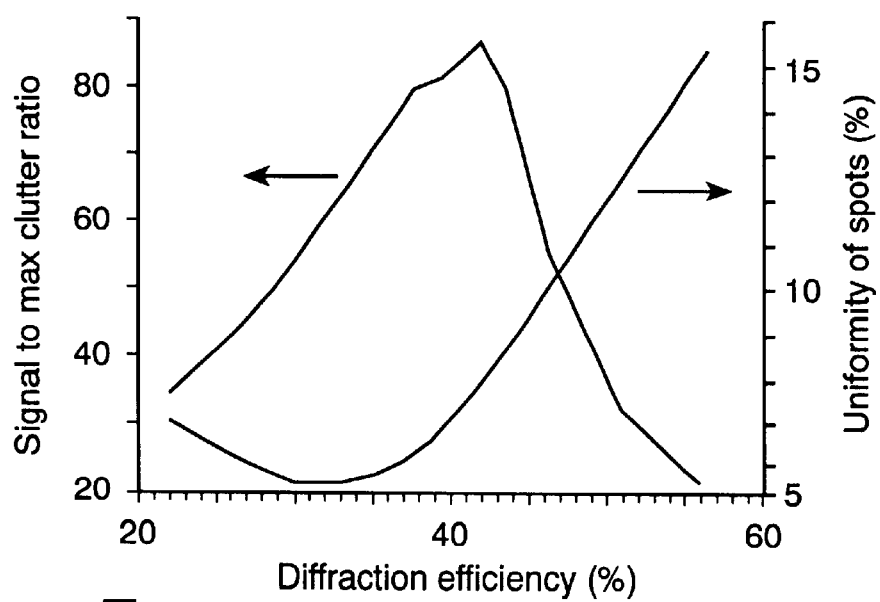
FIG. 5a is a diagram of the performance of a 64 spot diffractive optic spot array generator for different amounts of partial encoding as specified by diffraction efficiency (which is roughly proprotional to the threshold radius)
Figure 5B:
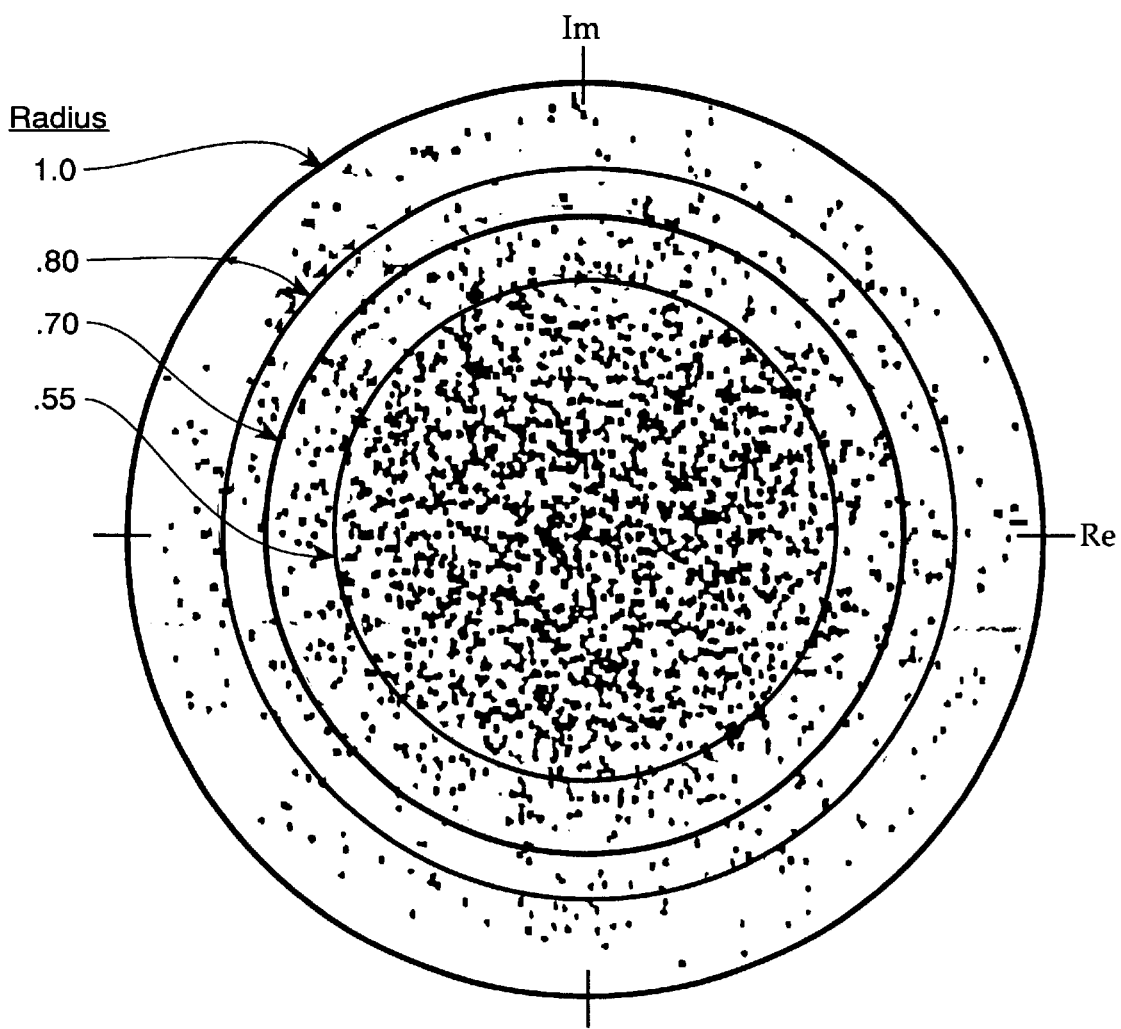
FIG. 5b is a scattergram of complex values that are encoded, which also illustrates four specific threshold radii.

FIG. 6 may be compared with FIG. 5b. Whereas FIG. 6 is presented for illustrating the concept, FIG. 5b plots on the complex plane all the desired values for a 300×300 pixel design. The desired complex values produce a diffraction pattern having an 8×8 array of equal intensity spots. Various encodings of this design are presented in various publications. In particular please consult the following references to see grayscale images of both computer simulated and experimentally measured diffraction patterns:

1. R. W. Cohn, Speckle Generation by Phase-Only Spatial Light Modulators: Random Phase Properties that Produce Fully Complex Modulation and that Model Optical Processor Performance. Final report for contract F19628-92-K-0021. (Mar. 11, 1996)
2. R. W. Cohn, A. A. Vasiliev, and H. Stark, Encoding of Complex Valued Composite Functions onto Spatial Light Modulators in Real-Time, proposed to U.S. Department of Defense. (Submitted Aug. 3, 1995)
3. R. W. Cohn and W. Liu, Pseudorandom Encoding of Fully Complex Modulation to Bi-Amplitude Phase Modulators, conference proceedings of Optical Society of America Topical Meeting on Diffractive Optics and Micro Optics. Paper DTuD4. (Apr. 30, 1996)

Also relevant is this reference, but it does not discuss grayscale images:

4. L. G. Hassebrook, M. E. Lhamon, R. C. Daley, R. W. Cohn and M. Liang, Random Phase Encoding of Composite Fully Complex Filters, Optics Letters, 21(4), 272–274. (Feb. 15, 1996)

Note both in FIG. 5b and 6 that for the most part, the desired values do not coincide with the modulation characteristic. Some complex values are shown that exceed the radius of the modulation curve. For pseudorandom encoding as described to this point, the effective amplitude can never be larger than the modulation. This is simply handled by scaling the desired complex values so that the maximum value coincides with the unit circle. Additional modifications are described below in which a rescaling is used that allows a portion of the complex values to lie outside the unit circle for the phase-only or bi-amplitude phase modulator, or even of a coupled modulation characteristic.

Figure 8:
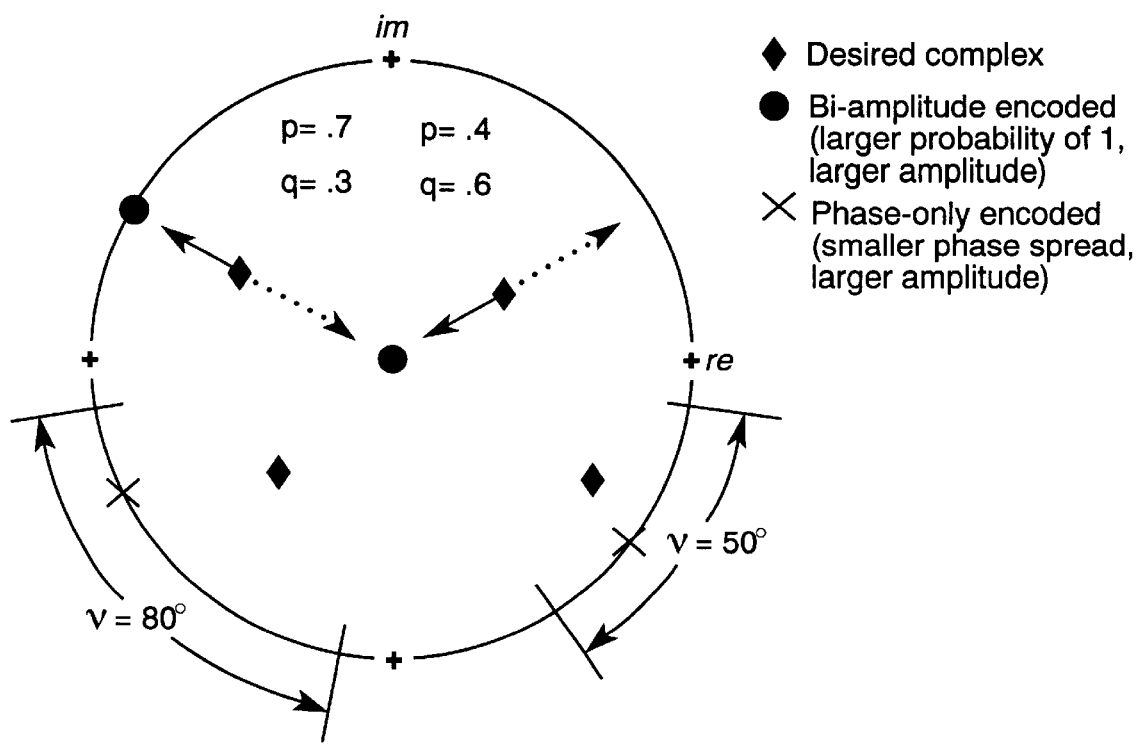
FIG. 8 is a chart of pseudorandom encoding algorithms for phase-only and bi-amplitude phase modulators.

FIG. 8 illustrates the phase-only and the bi-amplitude phase pseudorandom encoding algorithms on the complex plane. The bottom half of the complex plane illustrates the encoding of two desired complex values. Note that the spread is smaller for the complex value that is closer to the unit circle. The actual values (indicated by an "x") have been randomly selected over the respective spread. The spread is centered at the phase of the desired complex value. The upper half of the complex plane in FIG. 8 illustrates the bi-amplitude phase encoding algorithm. Note that the desired complex value that is closer to the unit circle is picked more frequently (70% of the time) to be on the unit circle than the smaller amplitude value (which is picked to be on the unit circle 40% of the time). The specific random selection in FIG. 8 shows that one complex value was selected on the unit circle and the other was selected to be zero amplitude. Obviously, the selected amplitudes can be opposite for different values of the random numbers.

The pseudorandom encoding algorithms generalize the steps a–c from above (which were originally described as the preferred implementation in U.S. Pat. No. 5,363,186). The generalized steps are given a set of desired complex values $a_{ci}$ and a relationship for the average amplitude as calculated in general by eq. 5, 5a or 5b for a specific modulation characteristic then for each pixel i=1 to N: a) determine from the equation for the average amplitude the statistical parameters (e.g. bias, spread, standard deviation) that cause the average amplitude $\langle a_i \rangle$ of the i'th pixel to equal the desired complex amplitude $a_{ci}$. The statistical average amplitude $\langle a_i \rangle$ is considered to be and referred to as the effective value of the designed modulation. b) generate random numbers si using a random number generator (typically a uniform random number generator for convenience). c) pass the random numbers through a function that transforms the uniform statistics of s, to those specified by step a). The function also depends on the statistical parameters (e.g. bias, spread, standard deviation) which are specified by step a). The resulting random numbers are $a_i$ the actual values of modulation that are used in place of the desired, but unachievable complex values $a_{ci}$. Furthermore the expected value of the $a_i$ are identical to $a_c$, according to step a).

The most comprehensive example of this procedure is given in example 2 for the coupled amplitude phase modulator. However, the procedure equally well describes all other examples and implementations given to this point. Additional extensions and improvements to the pseudorandom encoding algorithms are based on taking advantage of the design degree of freedoms that are usually available for the desired complex values and their relationships to the modulation characteristic.

One set of design freedoms are possible when encoding a linear combination of desired functions. This combination function is usually referred to as a composite function. In many applications of composite functions the weighting factors applied to the individual functions is not of central concern. In particular, the phase of the weighting factors can be changed without affecting the strength of the individual functions. However, the phase factors do affect the noise and hence the performance of pseudorandom encoding algorithms. A method of selecting the phase factors of composite functions is described subsequently which improves the performance of pseudorandom encoding. The unique feature of the algorithm is that the search for the optimal phase factors is done in the modulation plane without using fast Fourier transform and by a search for the maximum value of diffraction efficiency e.q (8). that is based on our speckle noise models. The step of selecting a desirable complex valued composite function $a_{ci}$ will also be referred to as step d below.

A second design freedom is to allow an overall scaling of the desired complex values (by a single magnitude and a phase factor) with respect to the modulation characteristic. Below we will refer to our method of implementing modulation values in excess of the amplitude of the modulation characteristic as partial pseudorandom encoding or as step e). Steps d) and e) (as will be shown below) usually improve performance but they increase computation time. However the amount of computation is reasonable and it is still possible to envision performing these additional steps in real time using current serial digital processors. Thus, it would be possible to apply these encoding algorithms to real time systems that need to update spatial light modulators with new information in time critical applications. This can be compared with the current methods of designing optimal modulation functions for fixed pattern or static diffractive optics which are generally referred to as global optimization. These methods, including the Gerchberg-Saxton, simulated annealing and genetic algorithms, are all are orders of magnitude slower than steps a) to e) because they either repetitively perform Fourier transforms or each pixel of the modulator is treated as a variable of the optimization algorithm.

Steps d) and e) are presented below. We first describe step e) partial pseudorandom encoding which combines pseudorandom encoding with an existing algorithm referred to as MEDOF that leads to better performance than either algorithm separately.

The MEDOF (minimum euclidean distance optimal filter) was originally introduced by Juday. This paper shows that MEDOF is optimal at mapping a desired fully complex optical correlation filter function onto a specified modulation characteristic, or curve. However if the function is composite then MEDOF can still be used but, as we will show, it is not optimal and partial encoding can perform better than MEDOF.

First specifying an optimal complex valued filter $a_c$ each complex value is then mapped to the modulator value that is closest to the desired complex value. The mean-squared sum of the distances can be minimized by varying two parameters. One parameter G gain, scales the magnitude of the complex values with respect to the modulator operating curve. The second parameter β rotates the complex values with respect to the modulator curve. The optimal values are found iteratively by varying these two parameters while evaluating the performance of the encoded function.

Figure 7:
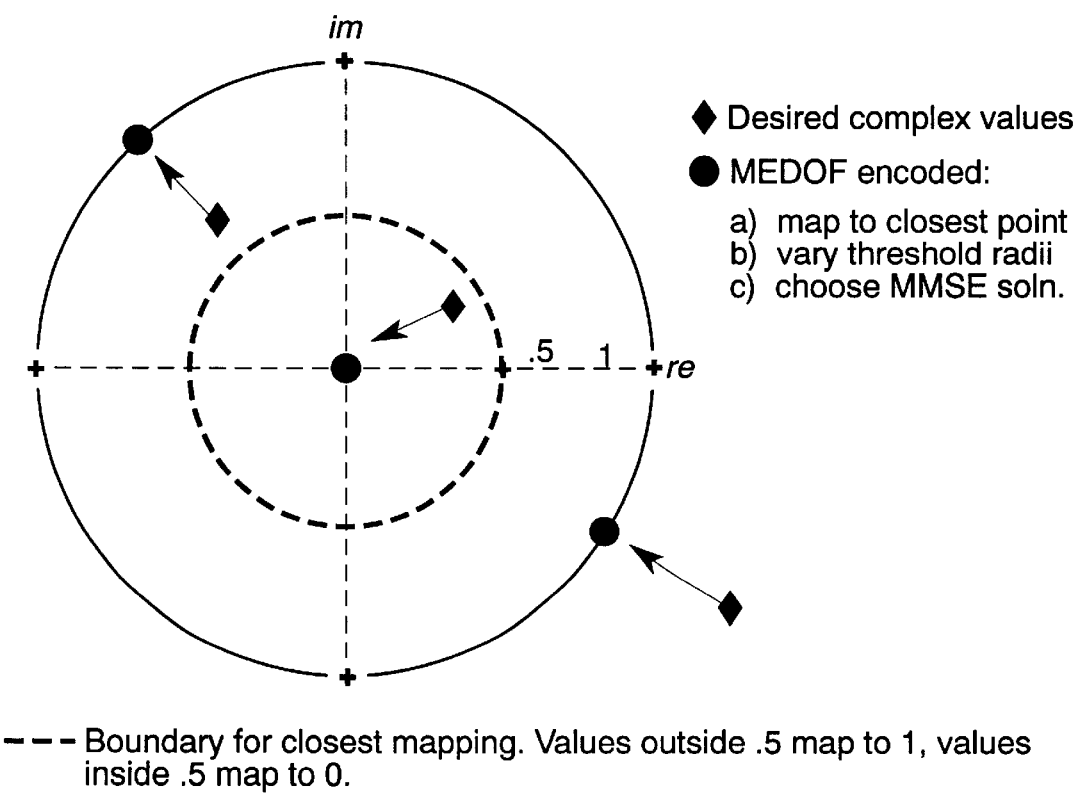
FIG. 7 is a chart of the MEDOF encoding algorithm for a bi-amplitude phase modulator.

Consider the special case of applying MEDOF to phase-only modulators. The minimum distance MEDOF mapping is identical for any values of these two parameters G and β since the modulation curve has circular symetry, and all desired amplitudes map to a single unity level. For this special case the MEDOF filters are identical to Homer and Gianino's phase-only filter, as in Homer's above-cited patent. We will show in describing FIG. 5 that partial encoding out performs MEDOF for a phase-only modulator. First however, consider the more involved MEDOF encoding of a bi-amplitude phase modulator. The encoding is illustrated in FIG. 7.

Note that the complex plane has been divided into three regions. The first region contains amplitudes between 0 and 0.5. The second region contains amplitudes between 0.5 and 1. The third region contains those amplitudes that are greater than 1. Note that the mapping of the complex values depends on in which region the complex values are located. Specifically, values are mapped to the closest point on the modulation curve. Thus complex values with amplitudes less than 1 are mapped to 0 and complex values with amplitudes greater than 0.5 are mapped to unity amplitude. Furthermore, for a circle the shortest distance between a point and the modulation curve is along radial lines of the circle. The mean squared error distance function is minimized as a function of G by numerical search. The solution usually requires that some of the desired complex values are outside the unit circle. Again, the circular symmetry eliminates any performance improvements as a function of the angle $\beta$. Obviously, this parameter does effect the performance of MEDOF encoding for coupled amplitude phase modulation and in those cases the mean square error is minimized as a function of both G and $\beta$.

Partial pseudorandom encoding is an algorithm that encodes some complex values using pseudorandom encoding and other complex values using MEDOF. An amplitude or gain factor G and (for coupled modulators) a phase factor $\beta$ are once again varied in order to optimize the performance of the encoding. However, with partial pseudorandom encoding, the performance can be optimized for cases where the application of MEDOF encoding alone does not improve performance (e.g. for the phase-only modulator). The partial encoding algorithm is illustrated in FIG. 9b for the bi-amplitude modulator together with the MEDOF-only algorithm from FIG. 7. Both the phase-only encoding algorithm and the bi-amplitude encoding algorithm from FIG. 8 are shown in FIG. 9 with the following modification: Any desired complex value that has an amplitude greater than the unit circle is mapped to the unit circle using the MEDOF algorithm. The values inside the unit circle are mapped using pseudorandom encoding. Gain factor G controls the total number of values encoded by pseudorandom and MEDOF algorithms. Note also that if G is equal to unity then all the complex values are contained within the unit circle and the algorithm reduces to pseudorandom encoding, and that when G is infinite, then the algorithm reduces to MEDOF-only (specifically Horner's phase-only filter). The improvements possible by partial encoding are easily seen by looking at the resulting diffraction patterns. These are shown in refs. 1–4. However, since these grayscale images do no reproduce well here, we will present a conceptual drawing illustrative of the improvements possible. This is FIG. 10. In actual simulations and demonstrations we frequently design modulation patterns that produce 8×8 arrays of equal intensity spots. Instead in FIG. 10 we sketch three representative diffraction patterns that would result from MEDOF (FIG. 10a), partial (FIG. 10b) and pseudorandom (FIG. 10c) encoding. The dashed line in FIG. 10a–c is the desired diffraction pattern that would result for the desired complex valued modulation. It is two spots of differing heights. There are enough features in this simple pattern to qualitiatively explain the types of effects observed for any of the three encoding algorithms (including the resulting grayscale images in references 1–4 presented above. When only MEDOF is used it is common to see effects in the form of false peaks at harmonically related frequencies. In FIG. 10a this is shown as false peaks at sum and difference frequencies. Also the intensities of the desired peaks differ dramatically from the desired intensities. These types of errors, especially the harmonically related noise order are quite evident on many recent spot array generator designs.

When only pseudorandom encoding is used (FIG. 10c) then effects are distributed over the entire diffraction pattern as noise or speckle. The peak noise for random encoding is often lower than the maximum intensity of the false peaks for MEDOF in FIG. 10, and also the desired peaks are often closer to the desired intensity. However, when partial encoding is used, there is usually a value of G for which the resulting and desired diffraction patterns are even more similar than for either MEDOF-only or pseudorandom-only encoding. This optimized result is illustrated in FIG. 10b. We consider this result to be better in that the resulting diffraction peaks are most close to the desired peaks and the peak background noise is closest to zero.

The improvements possible with partial pseudorandom encoding are usually significant for realistic designs. This can be seen in FIG. 9a for the case of the designs of 8×8 spot array generators mentioned above. The modulation is specified to be a 300×300 array of pixels. The modulation is encoded for various values of G. The encoded modulation is fast Fourier transformed and two important metrics, signal to peak ratio (SPR) and non-uniformity, that describe the quality of the diffraction pattern are plotted in FIG. 9a, as we now explain.

A conservative measure of signal to background noise is the average intensity of the 64 spots divided by the maximum noise intensity in the entire Fast Fourrier Transform file. We refer to this measure as signal to peak noise ratio (SPR). The average signal to average noise (intensity) ratio is typically one to two orders of magnitude larger than SPR. The non-uniformity is defined as a relative error; specifically, the standard deviation of the 64 spot intensities is divided by the average intensity. The maximum peak-to-peak fluctuation in each case is roughly 2–3 times larger than the measure of non-uniformity plotted in FIG. 9a. The efficiency of the encoding in approximating the desired complex design $\eta_e$ was calculated as the sum of the 64 spot intensities divided by the total energy in the Fourier transform plane. The average intensity transmittance of the modulator is $\eta_t = N_{on}/N$, where $N_{on}$ is the number of modulator pixels set to unity amplitude. The energy utilization efficiency is then $\eta = \eta_t \eta_e$. For the measures plotted in FIG. 9 were found for values of G between 1 and 1.82. Though G is not shown, note that encoding diffraction efficiency $\eta_e$ increases monotonically as a function of G.

Figure 9A:
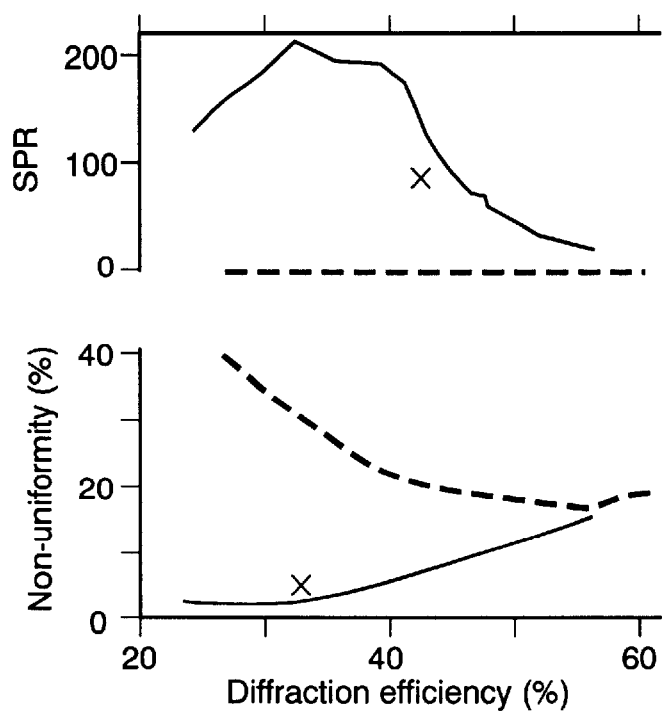
FIGS. 9a and 9b are charts comparing random and MEDOF encoding with the X's in FIG. 9a representing the best uniformity and the best SPR from FIG. 5a for pseudorandom phase-only encoding.
Figure 9B:
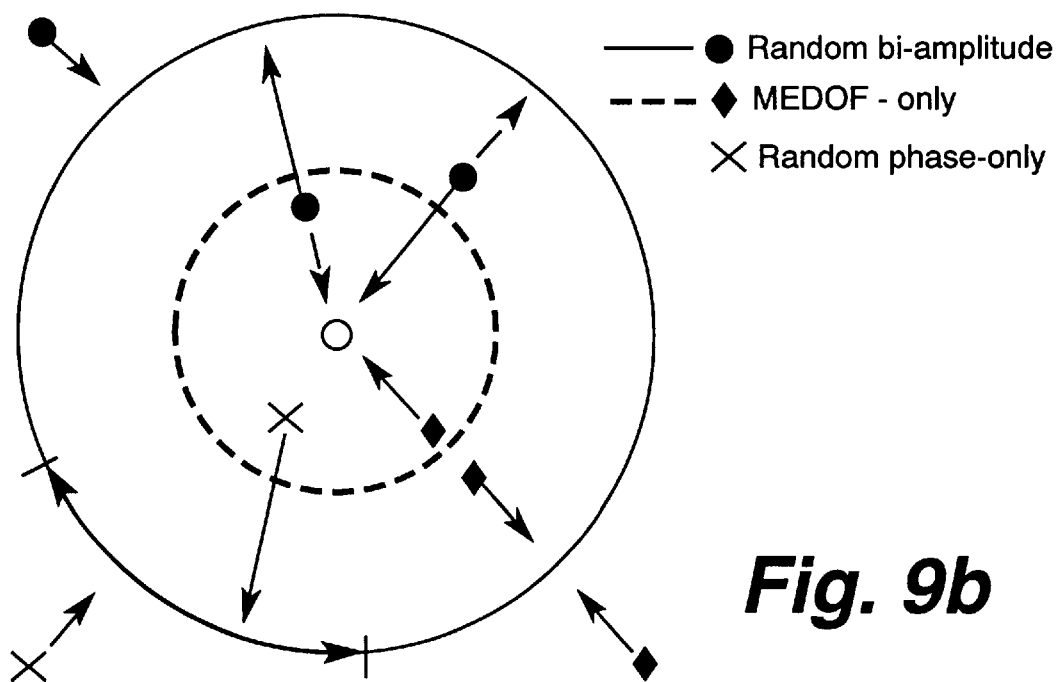

FIG. 9a shows that the best partial pseudorandom encoded design (solid curves) out performs the best MEDOF-only design (dashed curves) in SPR (212 vs. 19.5) and non-uniformity (2.5% vs. 17.8%). The efficiency $\eta$ of the best MEDOF-only encoding is higher than the best pseudorandom encoding (57% vs. 32%), but even this difference can be reduced by sacrificing some uniformity and SPR. For instance, even at an efficiency of 55% the partial pseudorandom encoded design out performs MEDOF in all other measures.

The reasons for the differences between MEDOF and pseudorandom encoding can be explained as follows:

The MEDOF design shows a series of harmonically related noise orders. Orders like this are quite common in many binary optics designs. The noise orders can be thought of as intermodulation distortion products that are known to result when two or more frequencies are passed through a nonlinearity. With multiple harmonically related frequencies there can be substantial interference and competition between desired frequencies, as well, which accounts for the large non-uniformity. The pseudorandom design is subject to the same nonlinearity, but it tends to minimize its effects. By using randomness, the noise has been distributed with uniform average intensity over the entire observation plane, as indicated by eq. (4) in general or eq. (23). The average noise intensity and nonlinear interferences have been reduced by distributing approximation errors over the entire available spatial bandwidth of the diffraction plane. Pseudorandom encoding can be viewed as attempting to maximize the entropy of the approximation errors. In selecting gain G some intermodulation products are accepted as long as an overall better performance in SPR, uniformity, etc. is achieved.

The further improvements resulting from partial encoding can be understood in terms of systematic and random types of errors, described in more detail in the articles by Cohn in June 1995 Opt. Eng. and Cohn and Horner in Applied Opt. in Aug. 10, 1994. For a radius of unity the only errors are due to the randomness of the pseudorandom encoding algorithm. The encoding of amplitude as randomness of phase causes the lowest amplitude values to introduce the most noise. If the radius is reduced then the distances to the lower amplitude values are reduced, and this reduces the amount of random noise. However, a systematic error (in amplitude) is also introduced for each complex value outside the unit circle. The systematic error is the distance between a desired value and the unit circle. Essentially any point outside the circle is reduced in amplitude (i.e. saturated) to the radius of the circle. Thus the plot in FIG. 9a shows that there is a balance between systematic and random errors that produces the best performance. The results in FIG. 9a quantitatively demonstrate the features that were qualitatively discussed with respect to FIG. 10. Further quantitative verification of the improvement possible with particular encoding is shown in FIG. 5. The same complex values were partially encoded for the phase-only modulator. The desired values are plotted in FIG. 5b. The radii of the four circles are referred to as threshold radii. The threshold radius is simply the reciprocal of G. That is to say that values exceeding the threshold are MEDOF encoded. The improvements shown in FIG. 5a are especially surprising when one recognizes that for the best uniformity case ($\eta=0.33$ or equivalently radius=0.8) that only 5% of the values are outside the circle and that for the best signal to clutter (SPR) case ($\eta=0.42$ or radius=0.7) that only 12% of the values are outside the circle. The best uniformity point for uniformity and for SPR for partial phase-only encoding are also plotted as X's on FIG. 9a.

Step e) will be summarized together with step d) after completion of the discussion of composite functions.

Algorithms for encoding fully complex composite functions onto limited modulation range SLMs and that can be performed with a small number of numerical operations in real- or near real time would greatly extend the performance and flexibility of optical processors by making them adaptive to changing and unpredictable situations. For instance, the algorithm to be described could be used to program a phase-only SLM to adaptively and independently steer a number of spots to arbitrary locations in the far-field. Such a system is comparable to a phase-only phased array antenna. The algorithm could also be used to construct in real time composite filters for optical correlators. For instance, the composite filters could be constructed on-the-fly to recognize a particular subset of objects (say tank, humvee and mortar) or a specific subset of views of an object (for distortion invariant recognition and tracking). However, multispot beam steering or distortion invariant pattern recognition is quite difficult to perform if only phase (but not amplitude) of the SLM is controlled. The pseudorandom encoding algorithm described in steps a–c overomes the problems in designing the correct SLM modulation in real-time but it also has a low diffraction efficiency compared to that possible using numerically intensive algorithms (requiring hours of computation.) Our generalized algorithm can produce higher diffraction efficiencies than the original pseudorandom encoding algorithm in steps a–c and the generalized algorithm can run in real-time.)

The term composite function is used to indicate a function that is a linear combination of complex-valued functions $g_i(x)$ such that $$a(x) = \sum_{i=1}^{M} a_i \exp(j\phi_i) g_i(x) \quad (24)$$

In many applications of SLMs and diffractive optics there is some freedom in selecting the (in general complex) weighting coefficients of the composite function. We show in this section that these coefficients can be accomplished in a way that can greatly improve the quality of the diffraction pattern of a pseudorandom encoded modulation, and without resorting to numerically intensive Fourier transform operations An example of an important composite function is the class of pattern recognition filters that are commonly referred to as synthetic discriminant functions (SDF). The SDF, in its simplest form, is a linear combination of filters. The importance of the SDF is that with only a single filter it is possible to perform complicated recognition tasks, such as identifying a three dimensional object from any arbitrary two dimensional view. This is accomplished by selecting the values of $a_i$ so that each view of the object $g_i$ correlates with the filter so as to produce an identical correlation peak intensity. It is clear that the phase weights $\phi_i$ do not affect the correlation intensities. These so-called degrees-of-freedoms can be used as design variables which are chosen so as to minimize the approximation error between the desired full-complex function and the encoded modulation.

Diffractive optical elements that are designed to produce arrays of equal intensity spots are often referred to as spot array generators. These have applications to optical interconnects, image processing using structured light sources, implementations of optical neural networks, and digital optical computers. A linear combination of complex sinusoids that produces M uniform intensity spots is $$a(x) = \sum_{i=1}^{M} \exp[j(2\pi f_i x + \phi_i)] \quad (25)$$

where $f_i$ are constants representing the frequencies, or the positions of the spots in the far-field diffraction pattern. For applications in which the phases of the spots are unimportant, the M phases $\phi_i$ can again be used as design variables for encoding.

The improvements possible by using the phase degrees of freedom can usually be significant. We recently designed a spot array generator and encoded it to a phase-only modulator described in reference 1. We used from our earlier patent and Jul. 10, 1994 appl. Opt. the observation that complex functions that have greater spatially averaged intensity are more accurately encoded and produce diffraction patterns with lower levels of speckle noise. For an N pixel (discretely sampled) function the average intensity is written $$\eta = \frac{1}{N} \sum_{i=1}^{N} a_c^2(i); \, a_c(i) \in [0, 1], \quad (8a)$$

where the amplitudes have been normalized by the maximum amplitude in order to define the physical quantity diffraction efficiency. For an ideal and perfectly general complex modulator the diffraction efficiency indicates the ratio of energy (under uniform intensity illumination) that is transmitted through the modulator. This is also the ratio of energy appearing in the diffraction pattern. For a pseudorandom encoded phase-only modulator, the diffraction efficiency η also indicates the energy that appears in the desired specular part of the diffraction pattern. Since 100% of the light is transmitted through a phase modulator, then by energy conservation, the remainder of the energy is diffracted into the diffuse pattern of speckle. This relationship, which has been rigorously analyzed, can be interpreted as a measure of how similar the complex function $a_c$ is to a phase only modulator. This observation has led to a search for the best function by only maximizing eq. 26.

The calculation only requires simple numerical operations that can be carried out by a serial processor. These operations can realistically be implemented with fixed point arithmetic for even greater speeds. Standard simulated annealing, genetic algorithms based approaches, and the widely used Gerchberg-Saxton technique to this point have all relied on repetitively Fourier transforming back and forth between the modulator and the far-field. Thus these techniques, due to the numerical costs of FFTs, are too slow for real-time applications. The optimization of eq. (8a) offers the potential of being performed in real time, both because it is a low overhead function and it depends on fewer (16 to 256) design variables which are the M values of $\phi_i$ associated with the M spots.

The current method of optimization is a method of global search that requires no a priori information. It also provides insight into the conditions that produce the best diffraction patterns for pseudorandom encoding. The optimization is simply to pick the M phase shifts as random variables uniformly distributed over $2\pi$ and calculate the efficiency. This step is repeated a number of times. The phases producing the largest value of η are used to specify the complex function in eq. (25) that is encoded. The largest values of diffraction efficiency are obtained for the most random phasing of the sinusoids, which is to say that the complex function is essentially identical to a fully developed speckle pattern. The intensity statistics for the resulting composite function are exponentially distributed. (Some idea of this can be gotten by noting that the number of complex values in FIG. 5b decrease with increasing radius). Since the encoding algorithm always normalizes the maximum amplitude to unity, it becomes clear that the maximum intensity excursion for an exponential distribution determines the efficiency. We have a preliminary proof that the optimization problem can simply be stated as minimizing the maximum random excursion of the amplitudes. Further improvement is possible by ignoring a few statistical outliers, which is the subject of the previous discussion of partial encoding.

The complex valves shown in FIG. 5b were determined by this method of optimization. The intensity of the 64 spots is uniform to within 7% standard deviation with respect to the average intensity and the average intensity of the spots is 33 times brighter than the maximum value of intensity found in the noise background. Note that if this optimization had not been performed, the performance would have also been worse for the subsequent step of partial encoding.

The encoded modulation was also programmed onto a phase-only spatial light modulator (a birefringent/non-twisted liquid crystal light valve, custom made for us by Hughes Malibu Research Labs to produce phase modulation in excess of $2\pi$). The results are only qualitatively correct, but the precise mapping of video signal to phase was not measured and calibrated. These results however indicate that the method will work with calibrated devices and that the method is not usually sensitive to errors or pseudorandom properties of SLMs To summarize, the pseudorandom encoding algorithms can be generalized by adding two more steps to steps a–c. These steps are performed prior to the other steps with the goal of using available design freedoms to enhance the performance or quality of the diffraction pattern from encoding. These steps are:

Step d) The individual functions are added together with different phases to produce a composite function $a_{ci}$. In particular we choose the values of phase using a random number generator. Even better performance is achieved by repeating this step a number of times and each time recalculating the diffraction efficiency. The complex modulation having the highest diffraction efficiency is selected for pseudorandom encoding by steps a–c. The individual functions are specified in the SLM plane so that the addition of the functions, as well as the calculation of the diffraction efficiency are done without using the fast Fourier transform. This permits the calculation to be performed with a relatively small number of computations.

Step e) The function $a_{ci}$ is scaled by a magnitude and phase factor. Values that have magnitudes exceeding the modulation characteristic are encoded by the MEDOF algorithm. Values inside the modulation curve are pseudorandom encoded. Currently the optimal threshold radius is found iteratively. Steps a–c are repeated for different values of radius until a modulation is found that produces the best performance according to a specified criterion (e.g. diffraction efficiency, SPR, uniformity, SNR, PNR, etc.) It appears that models, derived using eqs. (3),(4) and (7), can be developed to select a nearly optimal radius directly and without iteration.

A simulation study was also performed in which composite filters were designed to recognize an aircraft in any one of many distinct orientations. The filters (designed by Hassebrook in the Feb. 15, 1996 paper by Hassebrook et al in Optics Letters) were encoded using steps a–c,and e. However, the particular composite filter design method did not permit the use of step d. While the improvements over the phase-only filter, are evident, they are not as dramatic as for the encoding of spot arrays described above. The reasons include 1) the lower number of pixels in the filter SLM (64×64 as opposed to 300×300); 2) that step d was not used to level the filter amplitudes; and 3) that the Fourier spectra of the individual training images (aircraft silhouettes), being low bandwidth, are much less level to begin with than the individual sinusoids used in designing spot arrays. Future investigations should focus on modeling to what degree these effects influence the quality of encoded composite filters.

The bi-amplitude phase modulator also leads to the invention of specific hardware realizations shown in FIG. 11. These are fixed pattern diffractive optics. The solid areas represent light blocking sections of the device. SLMs could be envisioned, as well. However, the specific fixed pattern devices are of great practical importance because 1) phase relief surfaces are being produced with increasing frequency 2) microfabrication process methods already exist and are well known for undercoating or overcoating a phase relief surface, 3) the additional effort to add light blocking is minimal and 4) the improvement in performance by adding bi-amplitudes is substantial (as shown in FIG. 10a where bi-amplitudes outperformed phase only modulators by nearly a factor of 3.) The device implementations shown in FIG. 11 are shown as transmissive. However, the device can also be designed as a reflective device. The material for blocking light is most likely to be evaporated chrome or aluminum, which also makes excellent reflective films. The reflective film would be patterned over the phase steps instead of over a single plane as is done for the transmissive devices. There are many variations on the processing. The three specific embodiments described in FIG. 11 also suggest modified fabrication approaches that are equally suitable. In FIG. 11a the opaque layer is overcoated on resist. The metal is then overcoated with resist patterned by contact printing with a photomask. This patterns the metal. A laser or electron beam writer then patterns the resist in depth. A very simple, single pass method would be to use a laser (say an excimer laser) to ablate the opaque layer. By varying the exposure time of the laser the resist would be exposed by different amounts leading to the variable depth desired. Single pass methods are considered desirable because they minimize alignment errors. This is one of the major reasons for the growth in use of direct write patterning systems. FIG. 11b shows a second desirable method for fabricating the bi-amplitude diffractive optic. Here photoresist is overcoated on a custom patterned chrome glass photomask. Since custom photomask services are widely available and inexpensive the manufacturer need not even fabricate the photomask himself The resist layer can then be patterned by direct writing. This device can be made more rugged by etching the resist pattern into the glass using reactive ion etching or similar processes, to yield the device in FIG. 11c.

This invention grew out of the assumption that statistical models of scattering and diffraction from random rough surfaces could be used to gain insight into the performance of optical processors, and could be used to devise new approaches to performing signal processing operations with phase-only and amplitude-phase coupled SLMs. Both of these objectives were achieved.

The specific signal processing operation developed was the mapping of complex valued filters onto SLMs that do not produce all complex values through the procedure known as pseudorandom encoding. The method is especially useful for real-time optical processors because the encoding algorithm requires as few as one function calculation per SLM pixel to be encoded, and the calculation can be done even faster using lookup tables. Several logical extensions to pseudorandom encoding, as taught in U.S. Pat. No. 5,363,186, were also begun and further developed in this invention. These include the generalized pseudorandom encoding algorithm (including partial encoding and selection of phase degree of freedoms, for improving the performance of composite filters, pseudorandom encoding of coupled amplitude phase SLMs and pseudorandom encoding as binary amplitude phase modulators and device realizations.

There are many fruitful directions in which this work can be extended. Many pertain to logical extensions of pseudo-random encoding and error analyses to the fields of optical processing, diffractive optics and photolithography. This research is all concerned with diffraction from one plane to another.

Perhaps the most interesting, mathematically challenging and having the greatest potential payoff is the analysis and application of scattering from thick or distributed gratings. Many systems including volume holograms, three dimensional optical memories, distributed feedback lasers, acousto-optic tunable filters, submicron scale gratings and distributed reflector filters in fibers all work on the principle of scattering from multiple reflectors. There is a well known Fourier transform relationship between the strength of the scattering from the reflectors and the wavelength selectivity (i.e. frequency response) of the grating. Full complex weighting could be envisioned by including a spatially varying, random perturbation on top of a periodic grating structure. This could provide the ability to shape the frequency response of the structure. A pseudorandom encoded gratings could ultimately lead to significant reduction in the crosstalk between adjacent wavelengths in the acousto optic tunable filter; extend the tuning range of distributed feedback laser diodes; and similarly improve any distributed grating structure.

It is well known that if there are too many scatterers along the propagation direction then multiple scattering can seriously affect the filtering properties of the grating, even if the individual scatterers are weak. For deterministic gratings, Kogelnik's coupled wave theory for thick gratings is widely used. The logical step then in applying pseudorandom gratings would be to develop the statistical equivalent of Kogelnik's coupled mode equations. The mathematics appears daunting, but we believe that closed form equations that are simple enough to provide physical insight should be possible to develop in many cases.

A general conclusion that we have drawn from this study is that while statistics is usually viewed as a difficult field, statistics actually simplifies modeling and reasonably describes the wavefront superposition inherent in optical (especially Fourier transform type) processors.

We believe that that pseudorandom encoding of bi-amplitudes produces results that are good enough for many critical applications and the devices require no new development of processing art. We also believe that pseudorandom encoding concepts will eventually lead to advancements and improvements of the current numerically intensive design techniques.

The foregoing detailed description is illustrative only, and other adaptations uses and implementations of the invention will be readily apparent to those of ordinary skill in the art.

What is claimed is:

1. A process of designing a diffractive optics device and to synthesize phase and amplitudes of a far field diffraction pattern of an optical wave emitted by a phase-only spatial light modulator using principles of speckle generation and established optics, wherein said process comprises the steps of:

a first selecting step for selecting desired far field pattern of the diffractive optical wave emitted by the spatial light modulator performing a Fourier transform using fast Fourier transform identities from a table of Fourier transform pairs on the desired far field pattern of the optical wave to get a desired source distribution description that determines complex valued pixel amplitudes $\alpha_i$ for each pixel i; and a second selecting step for selecting pixel phases by a combination of random phase selection for specified portions of the diffraction pattern, and conventional pixel phase selection methods for predetermined portions of the diffraction pattern; and wherein said process comprises a pseudorandom encoding process, and wherein said second selection step uses a MEDOF method for encoding predetermined portions of the modulation pattern and random phase encoding for other portions of the modulation pattern.

\* \* \* \* \*